US012566808B2

(12) United States Patent
Najmabadi et al.

(10) Patent No.: US 12,566,808 B2
(45) Date of Patent: Mar. 3, 2026

(54) TRAVEL CONTENT ACQUISITION AND VALIDATION SYSTEM

(71) Applicant: Expedia, Inc., Seattle, WA (US)

(72) Inventors: Mani Najmabadi, Seattle, WA (US); Sarah Elizabeth Dean, Seattle, WA (US); Patrick James Bradley, Kirkland (CA); Niloofar Safi Samghabadi, Leander, TX (US); Samrat Halder, Bothell, WA (US)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 18/778,616

(22) Filed: Jul. 19, 2024

(65) Prior Publication Data

US 2026/0023795 A1     Jan. 22, 2026

(51) Int. Cl.
    *G06F 16/953*         (2019.01)
    *G06Q 50/14*          (2012.01)
(52) U.S. Cl.
    CPC ........... *G06F 16/953* (2019.01); *G06Q 50/14* (2013.01)
(58) Field of Classification Search
    CPC .............................. G06F 16/953; G06Q 50/14
    See application file for complete search history.

(56) References Cited

U.S. PATENT DOCUMENTS 7,676,034 B1 *   3/2010   Wu ................... H04M 3/42068
                                                          379/265.11
9,972,304 B2 *   5/2018   Paulik ................... G10L 15/063
2009/0271358 A1   10/2009   Lindahl et al.
2011/0153654 A1   6/2011   Lee
2018/0060822 A1 *   3/2018   Hou ................... G06Q 10/1053
2019/0103092 A1   4/2019   Rusak et al.
2019/0213258 A1   7/2019   Bacarella et al.
                        (Continued)

FOREIGN PATENT DOCUMENTS

CN         118503529 A *   8/2024   ............. G06Q 50/14
KR         102714333 B1 *   10/2024   ............. H04L 51/21
                        (Continued)

OTHER PUBLICATIONS

Chirag Shah, et al., "Using Large Language Models to Generate, Validate, and Apply User Intent Taxonomies", arXiv:2309.13063v1, obtained Sep. 14, 2023,—14 pages.
                        (Continued)

*Primary Examiner* — Mark E Hershley
(74) *Attorney, Agent, or Firm* — Foley & Lardner LLP

(57)                ABSTRACT

One embodiment of the present disclosure is a method for automatically acquiring and assessing travel data. The method includes acquiring travel data from a plurality of content sources using a plurality of AI agents, generating, using the AI agents, a plurality of output travel data items from the acquired travel data and a plurality of confidence scores for the output travel data items, generating a plurality of final confidence scores for the plurality of output travel data items, the plurality of final confidence scores generated based the confidence scores, source credibility scores and AI agent credibility scores, automatically determining an action to perform on one or more of the plurality of output travel data items using the final confidence scores of the one or more output travel data items, and automatically performing the action.

20 Claims, 6 Drawing Sheets

(56) References Cited

U.S. PATENT DOCUMENTS

| | | | |
|---|---|---|---|
| 2020/0065334 A1* | 2/2020 | Rodriguez | G06F 40/35 |
| 2023/0048742 A1* | 2/2023 | Mishra | G06F 40/284 |
| 2023/0131495 A1 | 4/2023 | Tater et al. | |
| 2023/0214925 A1* | 7/2023 | Cella | G06Q 30/06 |
| | | | 705/37 |
| 2023/0245651 A1* | 8/2023 | Wang | G06N 5/022 |
| | | | 704/275 |
| 2024/0039905 A1* | 2/2024 | Talavera | G06F 16/25 |
| 2024/0138930 A1* | 5/2024 | Tripathi | A61B 3/0066 |
| 2024/0256345 A1* | 8/2024 | Talavera | G06F 9/5027 |
| 2024/0362465 A1* | 10/2024 | Munguia Tapia | G06N 3/0464 |
| 2024/0386336 A1* | 11/2024 | Wynn | G06Q 50/14 |
| 2024/0412720 A1* | 12/2024 | Vasylyev | G06F 16/90332 |
| 2025/0029513 A1* | 1/2025 | Smith | G09B 7/02 |
| 2025/0054327 A1* | 2/2025 | Dines | G06V 30/1916 |
| 2025/0104693 A1* | 3/2025 | Papayiannis | G10L 13/10 |
| 2025/0166237 A1* | 5/2025 | Zeng | G06T 7/70 |
| 2025/0182222 A1* | 6/2025 | Gormley | G06Q 10/025 |
| 2025/0200293 A1* | 6/2025 | Liu | G06F 40/35 |
| 2025/0291628 A1* | 9/2025 | Bhandari | G06F 16/954 |
| 2025/0307783 A1* | 10/2025 | Mathavadoss | H04L 51/02 |

FOREIGN PATENT DOCUMENTS

| | | | | |
|---|---|---|---|---|
| WO | WO-2023/158676 A1 | 8/2023 | | |
| WO | WO-2024025863 A1 * | 2/2024 | | G06N 20/00 |
| WO | WO-2024/145537 A1 | 7/2024 | | |
| WO | WO-2024243216 A1 * | 11/2024 | | G06N 20/00 |

OTHER PUBLICATIONS

Yilun Du, et al., "Improving Factuality and Reasoning in Language Models through Multiagent Debate", arXiv:2305.14325v1, obtained May 23, 2023,—27 pages.

Anonymous, "Enhancing RAG with a Multi-Agent System VectorHub by Superlinked", Nov. 29, 2023 (Nov. 29, 2023) pp. 1-17, XP983268925, retrieved from the Internet: URL:https://superlinked.com/vectorhub/articles/enhancing-rag-multi-agent-system.

International Search Report and Written Opinion dated Sep. 26, 2025, for PCT/US2025/037762.

* cited by examiner

Figure 4:
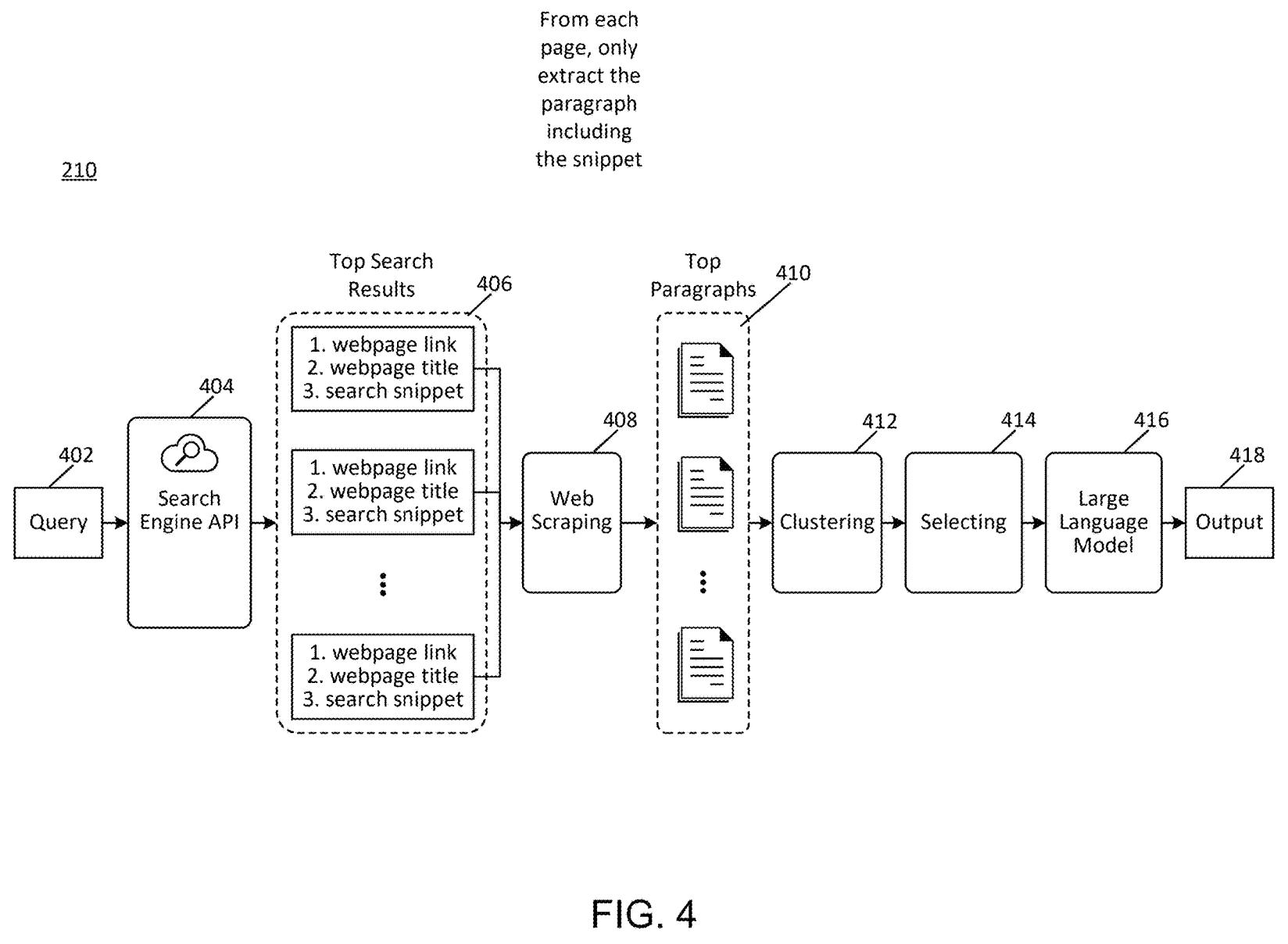

210

From each page, only extract the paragraph including the snippet

402 Query

404 Search Engine API

406 Top Search Results
1. webpage link
2. webpage title
3. search snippet 1. webpage link
2. webpage title
3. search snippet

...

1. webpage link
2. webpage title
3. search snippet

408 Web Scraping

410 Top Paragraphs

412 Clustering

414 Selecting

416 Large Language Model

418 Output

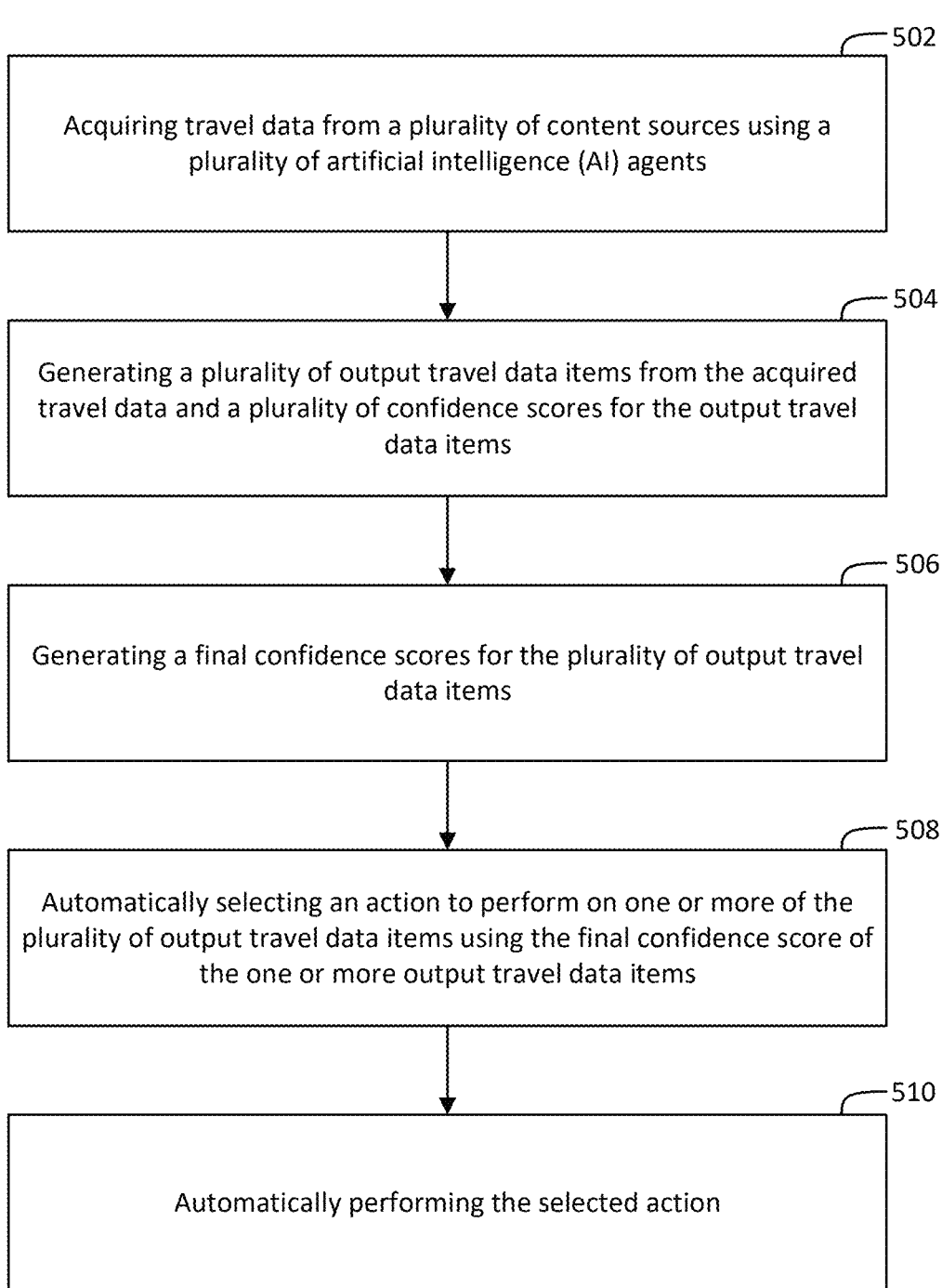

502

Acquiring travel data from a plurality of content sources using a plurality of artificial intelligence (AI) agents

504

Generating a plurality of output travel data items from the acquired travel data and a plurality of confidence scores for the output travel data items

506

Generating a final confidence scores for the plurality of output travel data items

508

Automatically selecting an action to perform on one or more of the plurality of output travel data items using the final confidence score of the one or more output travel data items

510

Automatically performing the selected action

FIG. 5

TRAVEL CONTENT ACQUISITION AND VALIDATION SYSTEM

TECHNICAL FIELD

The present disclosure relates generally to acquiring accurate information for travel content. Example embodiments of the present disclosure relate more specifically to an artificial intelligence-based system for automatically acquiring and verifying the accuracy of travel content by leveraging artificial intelligence, such as large language models (LLMs).

BACKGROUND

Travel planning may include acquiring/obtaining relevant and accurate travel information. Typically, the process of acquiring accurate travel content information is highly manual and it involves the selection of different data sources, reviewing the information, assessing the accuracy of the information, and selecting the final content. This process is time consuming, labor intensive, and costly and can result in inaccuracies. Therefore, systems and methods for more efficiently and accurately collecting and evaluating travel content information may be desired.

SUMMARY

One embodiment relates to method of automatically acquiring and assessing travel data. The method includes acquiring, by a processing circuit comprising one or more processors and one or more computer-readable storage media having instructions stored thereon executable by the one or more processors, the travel data from a plurality of content sources using a plurality of artificial intelligence (AI) agents, generating, by the processing circuit using the AI agents, a plurality of output travel data items from the acquired travel data and a plurality of confidence scores for the plurality of output travel data items, generating, by the processing circuit, a plurality of final confidence scores for the plurality of output travel data items, the plurality of final confidence scores generated based the plurality of confidence scores, source credibility scores associated with a reliability of the plurality of content sources from which the travel data was acquired for the plurality of output travel data items, and AI agent credibility scores associated with a reliability of the AI agents that generated the plurality of output travel data items, automatically determining, by the processing circuit, an action to perform on one or more of the plurality of output travel data items using the plurality of final confidence scores of the plurality of output travel data items, and automatically performing the action.

Another embodiment relates to travel content acquisition and validation system for acquiring travel content utilizing a plurality of artificial intelligence (AI) agents. The travel content acquisition and validation system includes one or more memory devices having instructions stored thereon that, when executed by one or more processors, cause the one or more processors to perform operations. The operations include acquiring travel data from a plurality of content sources using the plurality of AI agents, generating, using the AI agents, a plurality of output travel data items from the acquired travel data and a plurality of confidence scores for the plurality of output travel data items, generating a plurality of final confidence scores for the plurality of output travel data items, the plurality of final confidence scores generated based the plurality of confidence scores, source credibility scores associated with a reliability of the plurality of content sources from which the travel data was acquired for the plurality of output travel data items, and AI agent credibility scores associated with a reliability of the AI agents that generated the plurality of output travel data items, aggregating, by a master agent, the plurality of output travel data items and the plurality of final confidence scores for the plurality of output travel data items to generate an aggregated output and an aggregated confidence score, automatically determining an action to perform on one or more of the plurality of output travel data items using the aggregated confidence score, and automatically performing the action.

Still another embodiment relates to non-transitory computer readable medium comprising instructions stored thereon that, when executed by one or more processors, cause the one or more processors to perform operations. The operations include acquiring travel data from a plurality of content sources using a plurality of artificial intelligence (AI) agents, generating, using the AI agents, a plurality of output travel data items from the acquired travel data and a plurality of confidence scores for the plurality of output travel data items, generating a plurality of final confidence scores for the plurality of output travel data items, the plurality of final confidence scores generated based the plurality of confidence scores, source credibility scores associated with a reliability of the plurality of content sources from which the travel data was acquired for the plurality of output travel data items, and AI agent credibility scores associated with a reliability of the AI agents that generated the plurality of output travel data items, aggregating, by a master agent, the plurality of output travel data items and the plurality of final confidence scores for the plurality of output travel data items to generate an aggregated final output and an aggregated confidence score, automatically determining an action to perform on one or more of the plurality of output travel data items using the aggregated confidence score, automatically performing the action.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE DRAWINGS

FIG. 4 depicts a block diagram of a search augmented large language model process, according to an example embodiment.

FIG. 5 depicts a method for acquiring and validating travel content, according to an example embodiment.

DETAILED DESCRIPTION

Figure 1:
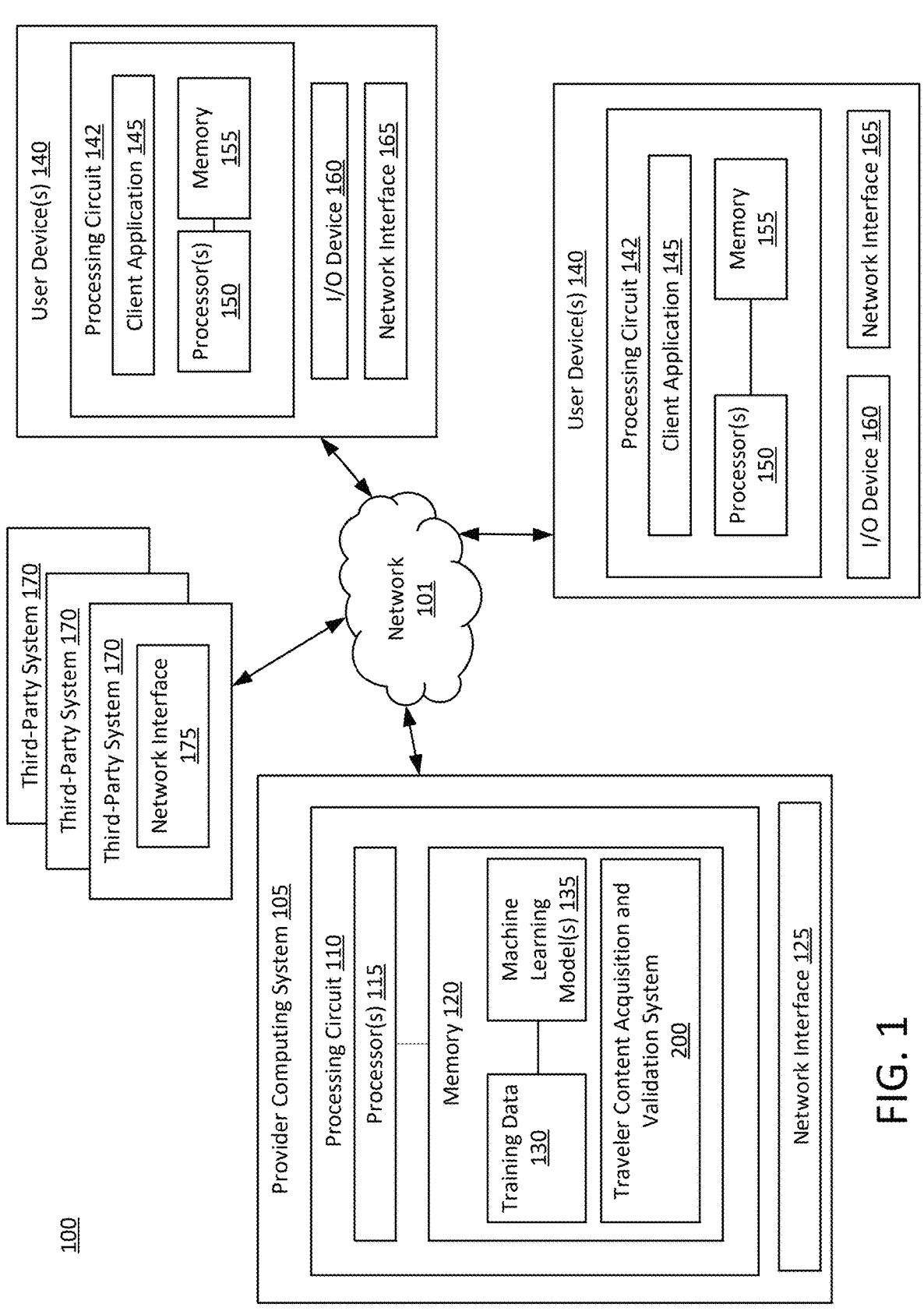
FIG. 1 depicts a block diagram of a travel intelligence system, according to an example embodiment.

Below are detailed descriptions of various concepts related to and implementations of techniques, approaches, methods, apparatuses, and systems for obtaining and evaluating travel-related content. The various concepts introduced above and discussed in detail below may be implemented in any of numerous ways, as the described concepts are not limited to any particular manner of implementation. Examples of specific implementations and applications are provided primarily for illustrative purposes.

Referring generally to the Figures, aspects and embodiments of the present disclosure relate to systems, computer-readable media, and methods for acquiring and validating travel content in a more efficient and accurate manner while using fewer resources. For example, the systems and methods described herein use fewer computing resources by utilizing large language models (LLMs) having smaller parameter sizes and on-disc sizes compared to other LLMs. The systems and methods described herein also use fewer human resources (e.g., capital, time, money, etc.) by streamlining travel content validation and reducing a number of validations a human performs. Acquiring factually accurate information for travel content is desirable to ensure travelers have access to the most comprehensive, up-to-date, and accurate information as possible to help them make decisions about their travel plans. Typically, the process of acquiring accurate content information is highly manual and it involves the selection of different data sources, reviewing the information, assessing the accuracy of the information, and selecting the final content. This process may be resource (human and computing) intensive and costly. Additionally, because of the volume and variety of content, this process can be subject to inaccuracies and can cause delays in the generation and/or publication of content, which may cause the information available to travelers not to be as current as may be desirable (e.g., not to reflect changes in circumstances/services/characteristics associated with a particular travel product or service).

According to some illustrative implementations, systems and methods described herein provide an artificial intelligence (AI) based system that automates the process of travel content acquisition by leveraging the capability of AI agents or models, such as Large Language Models (LLMs) to automatically obtain and assess travel-related content. Some embodiments may obtain and assess large quantities of documents and other content to determine whether the content is accurate and should be utilized, such as by including the content within output information to be provided to travelers (e.g., as part of a website, information in an app, etc.). In some embodiments, the system may automatically take action on the content based on a confidence in the accuracy of the content, such as by automatically approving the content (e.g., for inclusion in information presented to travelers) or flagging the content to be reviewed and verified by a human reviewer or other second level of review (e.g., a separate model).

Various embodiments described herein may provide one or more of a variety of technical improvements to conventional travel data content acquisition systems, including, but not limited to: (1) acquiring and assessing travel data more quickly and accurately such that high confidence travel data can be integrated into output in a more efficient manner and with less latency/delay (e.g., so travelers have more current and complete information); (2) utilizing less human and computing resources to manually identify and review high confidence data; (3) reducing a time to delivery to the traveler for high confidence data; (4) automatically identifying data at highest risk to be inaccurate or untrustworthy and focusing human resources or other multi-level review on that data; (5) increasing robustness of the automated assessment by assessing confidence in not only the output data but in the credibility of a source of the data and/or the AI obtaining and assessing/processing the data; and/or (6) automatically generating content combining data from multiple sources and/or generated using multiple AI agents/models by aggregating output from different sources and utilizing an aggregated confidence score to assess a confidence in the accuracy of the aggregated output (e.g., such that the aggregated output can be automatically approved/utilized/output/displayed in response to an assessment that the confidence is above a threshold level).

Before turning to the Figures, which illustrate certain example embodiments in detail, it should be understood that the present disclosure is not limited to the details or methodology set forth in the description or illustrated in the Figures. It should also be understood that the terminology used herein is for the purpose of description only and should not be regarded as limiting.

FIG. 1 illustrates a computing system 100 for generating travel content, according to an example embodiment. In some implementations, various components and/or systems of the system 100 may be configured to obtain and evaluate travel-related content from one or more content sources.

According to some embodiments, the system 100 includes a provider computing system 105 coupled to one or more user devices 140 and one or more third-party systems 170 via a network 101. The provider computing system 105 may be a computing system associated with a provider entity. The provider organization or entity may be a provider of goods and/or services. In this example, the provider entity is a travel services/experiences provider, such as a travel agency, that provides and maintains one or more accounts on behalf of the user. The provider may be a transportation provider (e.g., airline, car or rental vehicle service, rideshare/taxi service etc.), a lodging provider (e.g., hotel, rental property, cruise, etc.), an experience provider (e.g., theme parks, concerts, shows, events, excursions, etc.), or any combination thereof. In the example shown, the provider is a travel or experience booking agency that provides or enables a variety of experiences by interfacing/communicating with other providers (e.g., lodging providers, airline providers, etc.).

The provider computing system 105 can be structured as one or more backend computing systems including one or more servers and other computing components, in some embodiments. The provider computing system 105 can store or otherwise have access to predetermined training data 130. The predetermined training data 130 may include one or more of image data, other forms of non-text data, text data (e.g., destination descriptions, travel policies, caption data, travel metadata, chat history data, user account data, etc.), or any other form of data. The provider computing system 105 includes one or more machine learning models 135 that can be trained using the training data 130, as described in greater detail herein. Although shown as internal to the provider computing system 105, it should be understood that the training data 130 may be stored external to the provider computing system 105, for example, as part of a cloud computing system or an external storage medium in communication with the provider computing system 105 via the network 101. In some embodiments, although shown internal to the provider computing system 105, the machine learning models 135 may be implemented via the user device(s) 140.

Each component (e.g., the provider computing system 105, the network 101, the machine learning model 135, the user devices 140, the third-party systems 170, etc.) of the system 100 can be implemented using the hardware components or a combination of software with the hardware components of any computing system described herein. Each component of the system 100 can perform one or more of the functionalities detailed herein.

The provider computing system 105 can include at least one processing circuit 110, which may, as an example, include at least one processor 115 and at least one memory 120. The provider computing system 105 may include one or more servers that include one or more of the processors and/or memory components described above and herein. The memory 120 can store computer-executable instructions that, when executed by the processor 115, cause the processor 115 to perform one or more of the operations described herein. The processor 115 may include a microprocessor, an application-specific integrated circuit (ASIC), a field-programmable gate array (FPGA), a graphics processing unit (GPU), a tensor processing unit (TPU), etc., and/or combinations thereof. The memory 120 may include, but is not limited to, electronic, optical, magnetic, or any other storage or transmission device capable of providing the processor 115 with program instructions. The memory 120 may further include a magnetic disk, memory chip, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The provider computing system 105 can include one or more computing devices or servers that can perform various of the operations or functions described herein.

The provider computing system 105 can include a network interface 125. In some instances, the network interface 125 includes, for example, program logic and any associated hardware components (e.g., transceivers, ethernet cards, etc.) that connects the provider computing system 105 to the network 101. The network interface 125 facilitates secure communications between the provider computing system 105 and each of the user device(s) 140 and the third-party system(s) 170. The network interface 125 also facilitates communication with other entities, such as other providers of goods and/or services. The network interface 125 further includes user interface program logic configured to generate and present web pages to users accessing the provider computing system 105 over the network 101.

The network 101 can include packet-switching computer networks such as the Internet, local, wide, metro, or other area networks, intranets, satellite networks, other computer networks such as voice or data mobile phone communication networks, or combinations thereof. The provider computing system 105 of the system 100 can communicate via the network 101 with one or more computing devices, such as the one or more user devices 140 and the one or more third-party systems 170. The network 101 may be any form of computer network that can relay information between the provider computing system 105, the one or more user devices 140, the one or more third-party systems 170, and one or more information sources, such as web servers or external databases, amongst others. In some implementations, the network 101 may include the Internet and/or other types of data networks, such as a local area network (LAN), a wide area network (WAN), a cellular network, a satellite network, or other types of data networks. The network 101 may also include any number of computing devices (e.g., computers, servers, routers, network switches, etc.) that are configured to receive or transmit data within the network 101.

The network 101 may include any number of hardwired or wireless connections. Any or all of the computing devices described herein (e.g., the provider computing system 105, the one or more user devices 140, the one or more third-party systems 170, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 101. Any or all of the computing devices described herein (e.g., the provider computing system 105, the one or more user devices 140, the one or more third-party systems 170, etc.) may also communicate wirelessly with the computing devices of the network 101 via a proxy device (e.g., a router, network switch, or gateway). In some embodiments, a wired or a combination of wired and/or wireless connections may be used to enable communicable coupling.

The provider computing system 105 can include a travel content acquisition and validation system 200 and/or 201 which is configured to gather and validate travel data using large language models. The travel content acquisition and validation system 200 and/or 201 is described in more detail below with respect to FIG. 2.

The system 100 is shown to include multiple user devices 140. The user device 140 may be owned by, managed by, and/or otherwise associated with a user. As the provider is a travel experience provider, in this example, the user may be a traveler or a person who books experiences on behalf of a traveler/user. The user device 140 can include one or more computing devices that can perform various operations as described herein. For example, in some implementations, the user device 140 may be or may include, for example, a desktop or laptop computer (e.g., a tablet computer), a smartphone, a wearable device (e.g., a smartwatch), a personal digital assistant, and/or any other suitable computing device. In the example shown, the user device 140 is structured as a mobile computing device, namely a smartphone.

Each of the user devices 140 can include at least one processing circuit 142, which may, as an example, include at least one client application (e.g., client application 145), at least one processor (e.g., processor(s) 150), and at least one memory (e.g., memory 155). In some implementations, one or more of the user devices 140 can access various functions of the provider computing system 105 through the network 101. For example, the user device 140 can access one or more functions of the provider computing system 105 via the client application 145 of the user device 140 that is configured to display various user interfaces to the user device 140 via the network 101. In some embodiments, the user device 140 may include the machine learning models 135, as described herein.

The client application 145 can be coupled to and supported, at least partly, by the provider computing system 105. For example, in operation, the client application 145 can be communicably coupled to the provider computing system 105 and may perform certain operations described herein. In some embodiments, the client application 145 includes program logic stored in a system memory (e.g., memory 155) of the user device 140. In such arrangements, the program logic may configure a processor (e.g., processor(s) 150) of the user device 140 to perform at least some of the functions discussed herein with respect to the client application 145 of the user device 140. In the example shown, the client application 145 may be downloaded from an application store, stored in the memory 155 of the user device 140, and selectively executed by the processor(s) 150. In other embodiments, the client application 145 may be hard-coded into the user device 140. In still various other embodiments, the client application 145 is a web-based application. As alluded to above, the client application 145 may be provided by the provider associated with the provider computing system 105 such that the client application 145 supports at least some of the functionalities and operations described herein with respect to the provider computing system 105. In this way, the client application 145 may also be referred to as a provider institution client application or provider client application. In some embodiments, the client application 145 may be accessed and executed by the processor(s) 150 responsive to receiving various credentials of a user to access the client application 145 (e.g., a username, a password, a pin code, a biometric such as a facial scan or a fingerprint, a combination thereof, etc.).

In some instances, the client application 145 may additionally be coupled to the third-party system(s) 170 (e.g., via one or more application programming interfaces (APIs) and/or software development kits (SDKs)) to integrate one or more features or services provided by the third-party system(s) 170. In some instances, the third-party system(s) 170 may alternatively and/or additionally provide services via a separate client application 145.

The processor(s) 150 can include a microprocessor, an ASIC, an FPGA, a GPU, a TPU, etc., or combinations thereof. The memory 155 can store processor-executable instructions that, when executed by the processor(s) 150, cause the processor(s) 150 to perform one or more of the operations described herein. The memory 155 can include, but is not limited to, electronic, optical, magnetic, or any other storage or transmission device capable of providing the processor 150 with program instructions. The memory 155 can further include a memory chip, ROM, RAM, EEPROM, EPROM, flash memory, optical media, or any other suitable memory from which the processor(s) 150 can read instructions. The instructions can include code from any suitable computer programming language.

The user device 140 is further shown as including an I/O device 160 and a network interface 165. The I/O device 160 can include various components for receiving inputs, providing outputs, or receiving and providing inputs and outputs, respectively, to a user of the user device 140. For example, the I/O device 160 can include a display screen such as a touchscreen, a mouse, a button, a keyboard, a microphone, a speaker, an accelerometer, actuators (e.g., vibration motors), any combination thereof, etc. The I/O device 160 may also include circuitry/programming/etc. for operating such components. The I/O device 160 thereby enables communications to and from a user, for example communications relating to travel recommendations as described in further detail herein.

The network interface 165 includes, for example, program logic and various devices and/or components and systems (e.g., transceivers, etc.) that connect the user device 140 to the network 101. The network interface 165 facilitates secure communications between the user device 140 and each of the provider computing system 105 and/or the third-party systems 170. The network interface 165 also facilitates communication with other entities, such as other providers of goods and/or services.

The system 100 is shown to include the third-party system 170 (although only one is shown, there could be multiple or, in some embodiments, none). The third-party system or third-party system 170 may be a third party relative to the provider, and may be associated with a third party entity. For example, the third-party entity may be or may include various goods and/or services provider entities including, but not limited to, a transportation provider (e.g., airline, car service, etc.), a lodging provider (e.g., hotel, rental property, cruise, etc.), an experience provider (e.g., theme parks, concerts, shows, events, excursions, etc.), an insurance provider, or any combination thereof. The provider computing system 105 may communicate with the third-party system 170 to make bookings and reserve experiences on behalf of the traveler/user. The third-party system 170 includes a respective network interface 175 to facilitate exchanging data with the provider computing system 105 and/or the user device 140 through the network 101. The third-party system 170 may include one or more servers. The third-party system 170 may include one or more APIs and/or SDKs associated with the third-party entity for exchanging data with the provider computing system 105 and/or the user device 140, as described herein.

The machine learning model 135 may be structured to recognize patterns, trends, and the like in data and make one or more determinations. In some embodiments, the machine learning model 135 may include a predictive AI model and/or a generative AI model, both of which are described herein. In some embodiments, the AI model may utilize supervised learning. Supervised learning is a method of training a machine learning model (e.g., machine learning model 135) given input-output pairs (e.g., stored in the training data 130). An input-output pair is an input with an associated known output (e.g., an expected output). The machine learning model 135 may be trained on known input-output pairs (e.g., the training data 130) such that the machine learning model 135 can learn how to predict known outputs given known inputs. Once the machine learning model 135 has learned how to predict known input-output pairs, the machine learning model 135 can operate on unknown inputs to predict an output. In some implementations, part or all of the machine learning model 135 may additionally or alternatively be implemented in the user device 140 or in other devices shown and described herein (e.g., other edge devices).

The machine learning model 135 may be trained based on general data and/or personalized data (e.g., data based on a specific user) such that the machine learning model 135 may be trained specific to a particular user. Training inputs and actual outputs may be provided to the machine learning model 135. For example, as described in greater detail herein, training inputs may include images and/or other medias, captions to describe the images, metadata, user account data, and/or other data stored in the provider computing system 105. Actual outputs may include captions, traveler data, and/or property data. The training inputs and the actual outputs may be received from the training data 130. For example, the training data 130 may contain various datasets including the images and/or other medias, captions, metadata, traveler data, property data, etc., as described herein. Thus, the machine learning model 135 may be trained to predict recommended properties based on the training inputs and actual outputs used to train the machine learning model 135.

In operation, the machine learning model 135 may use various training inputs (e.g., images, captions, metadata, traveler data, property data, etc.) to determine and, particularly, predict various outputs (e.g., travel recommendations, search suggestions, etc.), by applying the current state of the machine learning model 135 to the training inputs. A comparator may compare the predicted outputs to actual outputs to determine an amount of error or differences. For example, the predicted output may be compared to actual output. In other words, the actual outputs may be based on historical data of recommendations made to a user of the user device 140 and stored in the training data 130.

During training, the error determined by the comparator may be used to adjust the weights in the machine learning model 135 such that the machine learning model 135 changes (or learns) over time. The machine learning model 135 may be trained using a backpropagation algorithm, for instance. The backpropagation algorithm operates by propagating the error signal. The error signal may be calculated each iteration (e.g., each pair of training inputs and associated actual outputs), batch and/or epoch, and propagated through the algorithmic weights in the machine learning model 135 such that the algorithmic weights adapt based on the amount of error. The error is minimized using a loss function. Non-limiting examples of loss functions may include the square error function, the root mean square error function, and/or the cross-entropy error function.

The weighting coefficients of the machine learning model 135 may be tuned to reduce the amount of error, thereby minimizing the differences between (or otherwise converging) the predicted output and the actual output. The machine learning model 135 may be trained until the error determined at the comparator is within a certain threshold (or a threshold number of batches, epochs, or iterations have been reached). The trained machine learning model 135 and associated weighting coefficients may subsequently be stored in memory or other data repository (e.g., a database) such that the machine learning model 135 may be employed on unknown data (e.g., not training inputs). Once trained and validated, the machine learning model 135 may be employed during a testing (or an inference phase). During testing, the machine learning model 135 may ingest unknown data to predict future data.

A first machine learning model 135 can include one or more neural networks, including, but not limited to, neural networks configured as generative models. For example, the first machine learning model 135 can predict or generate new data (e.g., artificial data; synthetic data; data not explicitly represented in the training inputs and/or the actual outputs used for configuring the first machine learning model 135). The first machine learning model 135 can generate any of a variety of modalities of data, such as text, speech, audio, images, and/or video data. In some embodiments, a neural net can include one or more nodes which may be arranged in layers for providing outputs of one or more nodes of one layer as inputs to one or more nodes of another layer. The neural network can include one or more input layers, one or more hidden layers, and one or more output layers. Each node can include or be associated with parameters such as weights, biases, and/or thresholds, representing how the node can perform computations to process inputs to generate outputs. The parameters of the nodes can be configured by various learning or training operations, such as unsupervised learning, weakly supervised learning, semi-supervised learning, or supervised learning.

The first machine learning model 135 can include, for example and without limitation, one or more language models, LLMs, attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

For example, the first machine learning model 135 can include at least one GPT model. The GPT model can receive an input sequence and can parse the input sequence to determine a sequence of tokens (e.g., words or other semantic units of the input sequence, such as by using Byte Pair Encoding tokenization). For example, the input sequence may include a textual input submitted by a user during a chat session, as described herein. The GPT model can include or be coupled with a vocabulary of tokens, which can be represented as a one-hot encoding vector, where each token of the vocabulary has a corresponding index in the encoding vector; as such, the GPT model can convert the input sequence into a modified input sequence, such as by applying an embedding matrix to the tokens of the input sequence (e.g., using a neural network embedding function), and/or applying positional encoding (e.g., sin-cosine positional encoding) to the tokens of the input sequence. The GPT model can process the modified input sequence to determine a next token in the sequence (e.g., to append to the end of the sequence), such as by determining probability scores indicating the likelihood of one or more candidate tokens being the next token, and selecting the next token according to the probability scores (e.g., selecting the candidate token having the highest probability scores as the next token). For example, the GPT model can apply various attention and/or transformer-based operations or networks to the modified input sequence to identify relationships between tokens for detecting the next token to form the output sequence.

The first machine learning model 135 can include at least one diffusion model, which can be used to generate image and/or video data. For example, the diffusion model may be used to generate images related to one or more travel experiences (e.g., a travel property, a destination, an activity, etc.) responsive to an input from a user during a travel planning chat session. In some embodiments, the diffusional model can include a denoising neural network and/or a denoising diffusion probabilistic model neural network. The denoising neural network can be configured by applying noise to one or more training data elements (e.g., images, video frames) to generate noised data, providing the noised data as input to a candidate denoising neural network, causing the candidate denoising neural network to modify the noised data according to a denoising schedule, evaluating a convergence condition based on comparing the modified noised data with the training data instances, and modifying the candidate denoising neural network according to the convergence condition (e.g., modifying weights and/or biases of one or more layers of the neural network). In some implementations, the first machine learning model 135 includes multiple generative models, such as GPT and diffusion models, that can be trained separately or jointly to facilitate generating multi-modal outputs, such as travel experiences (e.g., travel property listings) that include both text and image/video information.

In some embodiments, the first machine learning model 135 may be configured to determine one or more second machine learning models 135. For example, a model updater may configure (e.g., trains, updates, modifies, fine-tunes, etc.) the first machine learning model 135 to determine the one or more second machine learning model 135. In some implementations, the second machine learning model 135 can be used to provide application-specific outputs, such as outputs having greater precision, accuracy, or other metrics, relative to the first machine learning model 135, for targeted applications.

The second machine learning model 135 can be similar to the first machine learning model 135. For example, the second machine learning model 135 can have a similar or identical backbone or neural network architecture as the first machine learning model 135. In some implementations, the first machine learning model 135 and the second machine learning model 135 each include generative AI machine learning models, such as LLMs (e.g., GPT-based LLMs) and/or diffusion models. The second machine learning model 135 can be configured using processes analogous to those described for configuring the first machine learning model 135.

In some implementations, the model updater can perform operations on at least one of the first machine learning model 135 or the second machine learning model 135 via one or more interfaces, such as application programming interfaces (APIs). For example, the one or more machine learning models 135 can be operated and maintained by one or more systems separate from the provider computing system 105 (e.g., by the user device 140, as shown in FIG. 1). The model updater can provide training data to the first machine learning model 135, via the API, to determine the second machine learning model 135 based on the first machine learning model 135 and the training data 130. The model updater can control various training parameters or hyperparameters (e.g., learning rates, etc.) by providing instructions via the API to manage configuring the second machine learning model 135 using the first machine learning model 135.

The model updater can perform various machine learning model configuration/training operations to determine the second machine learning model 135 using the data from the training data 130, as described above. For example, the model updater can perform various updating, optimization, retraining, reconfiguration, fine-tuning, or transfer learning operations, or various combinations thereof, to determine the second machine learning model 135. The model updater can configure the second machine learning model 135, using the training data 130, to generate outputs (e.g., recommendations) in response to receiving inputs (e.g., prompts), where the inputs and outputs can be analogous to data of the training data 130 (e.g., training inputs and actual outputs).

For example, the model updater can identify one or more parameters (e.g., weights and/or biases) of one or more layers of the first machine learning model 135, and maintain (e.g., freeze, maintain as the identified values while updating) the values of the one or more parameters of the one or more layers. In some implementations, the model updater can modify the one or more layers, such as to add, remove, or change an output layer of the one or more layers, or to not maintain the values of the one or more parameters. The model updater can select at least a subset of the identified one or parameters to maintain according to various criteria, such as user input or other instructions indicative of an extent to which the first machine learning model 135 is to be modified to determine the second machine learning model 135. In some implementations, the model updater can modify the first machine learning model 135 so that an output layer of the first machine learning model 135 corresponds to output to be determined.

Responsive to selecting the one or more parameters to maintain, the model updater can apply, as input to the second machine learning model 135 (e.g., to a candidate second machine learning model 135, such as the first machine learning model 135 having the identified parameters maintained as the identified values), training data (e.g., from the training data 130). For example, the model updater can apply the training data 130 as input to the second machine learning model 135 to cause the second machine learning model 135 to generate one or more candidate outputs.

The model updater can evaluate a convergence condition to modify the candidate second machine learning model 135 based at least on the one or more candidate outputs and the training data applied as input to the candidate second machine learning model 135. For example, the model updater can evaluate an objective function of the convergence condition, such as a loss function (e.g., L1 loss, L2 loss, root mean square error, cross-entropy or log loss, etc.) based on the one or more candidate outputs and the training data; this evaluation can indicate how closely the candidate outputs generated by the candidate second machine learning model 135 correspond to the ground truth represented by the training data 130. The model updater can use any of a variety of optimization algorithms (e.g., gradient descent, stochastic descent, Adam optimization, etc.) to modify one or more parameters (e.g., weights or biases of the layer(s) of the candidate second machine learning model 135 that are not frozen) of the candidate second machine learning model 135 according to the evaluation of the objective function. In some implementations, the model updater can use various hyperparameters to evaluate the convergence condition and/or perform the configuration of the candidate second machine learning model 135 to determine the second machine learning model 135, including but not limited to hyperparameters such as learning rates, numbers of iterations or epochs of training, etc.

In some embodiments, the machine learning model 135 may be a neural network model. The neural network model may include a number of hidden layers between the input layer and the output layer and my produce an accurate output. In some embodiments, the output may be one or more numbers. For example, output may be a vector of real numbers subsequently classified by various one or more of any classifiers. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes. Other classifiers may be used to make other classifications. For example, the sigmoid function, makes binary determinations about the classification of one class (i.e., the output may be classified using label A or the output may not be classified using label A).

It is noted that various other forms of classifiers may be implemented or used in the present disclosure (e.g., in the machine learning model 135). For example, the machine learning model 135 described herein may include or use a support vector machine, random forest, K-nearest neighbors, naïve bayes, or any other type or form of classifier.

Figure 2A:
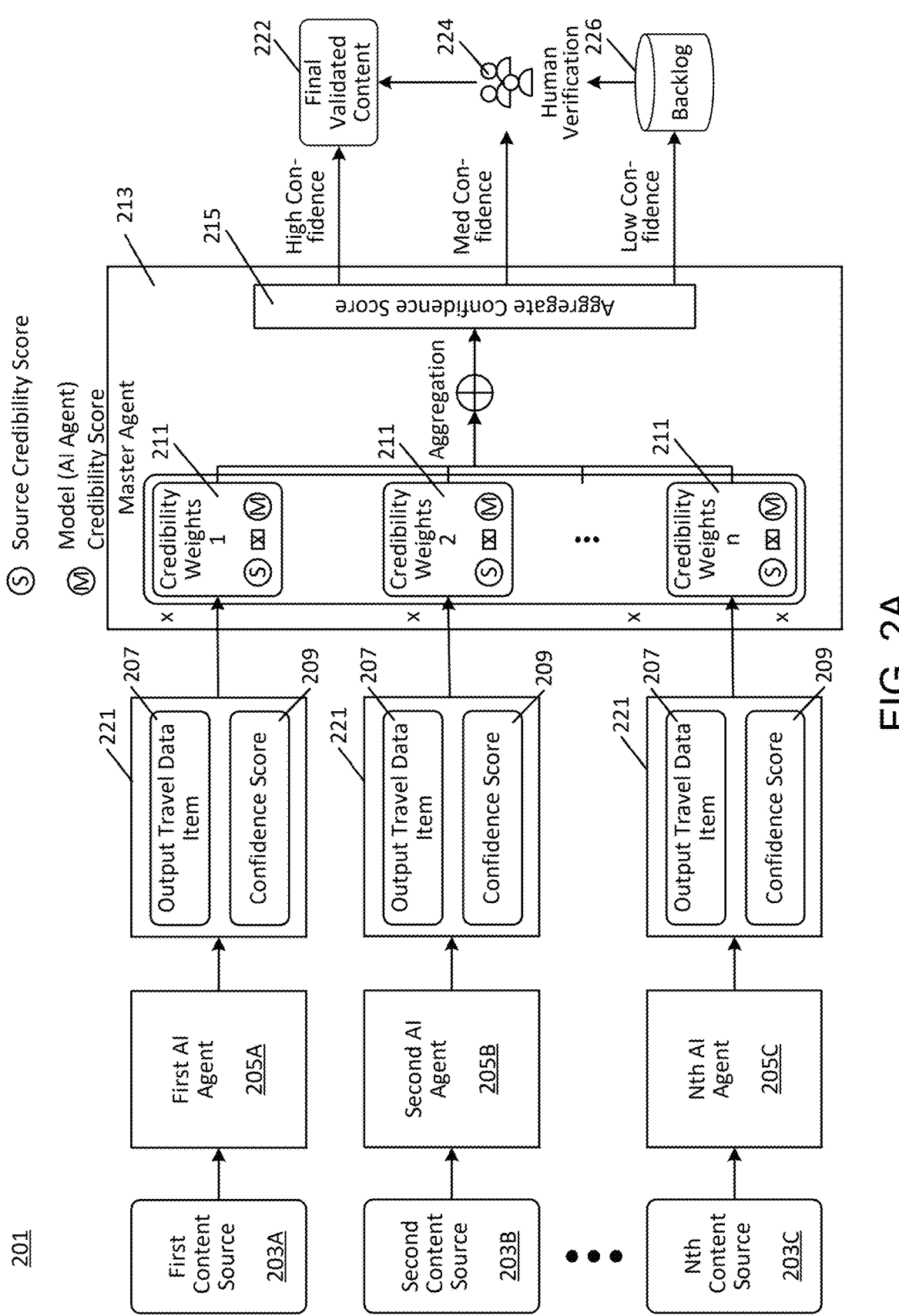
FIG. 2A depicts a block diagram of a travel content acquisition and validation system, according to a first example embodiment.

FIG. 2A illustrates the travel content acquisition and validation system 201 according to a first embodiment. The travel content acquisition and validation system 201 is configured to acquire and evaluate travel content, according to an example embodiment. In some implementations, various components and/or systems of the travel content acquisition and validation system 200 may be configured to utilize one or more artificial intelligence agents to acquire travel content from multiple different content sources. The travel content acquisition and validation system 200 is an artificial intelligence-based system that automates the process of content acquisition, such as by, in some embodiments, leveraging the capability of Large Language Models (LLMs) to act as agents which search for and acquire travel content. Further, the agents may also be utilized to validate the content that is surfaced in the search as will be explained in more detail below.

According to some embodiments, the travel content acquisition and validation system 200 acquires the travel content from a variety of content sources including a first content source 203A, a second content source 203B, and an Nth content source 203C (i.e., from one or more of any number n content sources). In some embodiments, the content sources may be first-party content sources, third-party content sources, or any other content sources. Each content source 203 may have an associated source credibility score indicative of a credibility of the information found in the source. More details regarding the content sources are provided below with respect to FIG. 2B.

The travel content acquired from the first content source 203A, the second content source 203B, and the Nth content source 203C may be processed by one or more AI agents 205 (e.g., large language models). For example, travel content received from the first content source 203A may be processed by a first AI agent 205A, travel content received from the second content source 205B may be processed by a second AI agent 205B, and travel content received from the Nth content source 203C may be processed by a Nth AI agent 205C. In some embodiments, the AI agents 205A, 205B, and 205C may be a retrieval augmented LLM, a search augmented LLM, or any other type of LLM or other AI agent/model used to process data.

In some embodiments, the AI agents are configured to generate outputs of travel content data based on the travel content received from the content sources 203A, 203B, and 203C. Specifically, the AI agents 205A, 205B, and 205C are configured to generate multiple output travel data items 207 and their associated confidence scores 209. The combination of the output travel data items 207 and the confidence scores 209 may be referred to generally as outputs 221. In some embodiments, the confidence score 209 for each output travel data item 207 may be generated by the AI agent 205 that has processed the travel content received from the corresponding content source. For example, the first AI agent 205A may generate a confidence score 209 for an output travel data item 207 generated based on information the first content source 203A. The confidence scores 209 describes a confidence level of each model (e.g., each AI agent 205) in the particular information generated/predicted by the model to generate the output travel data item 207 (e.g., a confidence that the model prediction/generation represented in the output travel data item 207 is correct and satisfies the model query). The confidence score 209 may be updated during validation, in which the output of each agent is compared with a ground truth. The confidence score 209 of the model may be modified by evaluating the model and updating/further training the model responsive to an evaluation indicating that the output of the model does not sufficiently satisfy the model query. For example, the model may produce a confidence score 209 indicating that the model is highly confident that the output travel data item 207 correctly satisfies the model query. However, it may be determined (e.g., by a human analyst) that the output travel data item 207 does not correctly or sufficiently satisfy the model query. The confidence score of the model may be updated to reflect that the model has less confidence that output travel data items 207 satisfy the model query. The confidence score 209 may be fed into a credibility weighting system (e.g., the master agent 213 described herein) configured to determine a reliability of the content source based on a source credibility (e.g., credibility of the content source 203) and a model credibility (e.g., credibility of the AI agent 205).

In some embodiments, the AI agents 205A, 205B, and 205C are configured to calibrate the confidence scores 209 based on the reliability of the output travel data items 207 and a sufficiency of the travel data items 207 satisfying the model query. The confidence scores 209 of each AI agent 205 may be calibrated and/or normalized across all agents 205 for use in score aggregation that will be described herein. In some embodiments, the AI agents 205A, 205B, and 205C use prompt agreement techniques to calibrate the confidence scores 207. In other embodiments, the AI agents 205A, 205B, and 205C calibrate the confidence scores using a variety of other machine learning techniques. In some embodiments, the confidence scores may be calibrated to generate outputs with calibrated scores. Particularly, the individual confidence scores may be normalized to generate the calibrated score which indicates a relative comparison between the individual confidence scores associated with each of the different output travel data items 207.

In some embodiments, the travel content acquisition and validation system 201 may optionally include a master agent 213 which is configured to assign credibility weights 211 to each of the outputs 221. The credibility weight represents the reliability of the content source (e.g., source credibility score) and the LLM model/AI Agent (e.g., AI agent credibility score) associated with each of the outputs. Each content source 203 may have an associated source credibility score S, indicating a credibility of the source based on types of data generated from the source. Each model or AI agent 205 may have an associated credibility score M, indicating a credibility of the model to generate credible outputs. The credibility weight 211 may be generated for a specific source and AI agent pair by multiplying the source credibility score with the model credibility score. The confidence score 209 may be utilized, along with the credibility weight 211, to generate a final confidence score. The master agent 213 utilizes the credibility weights in generating a plurality of final confidence scores (e.g., a first final confidence score, a second final confidence score, an n-th final confidence score, etc.) and/or an aggregated confidence score 215. In some embodiments, outputs which are assigned a higher confidence×credibility weight 211 (e.g., combination of the confidence score 209 and credibility weight 211) will be given more weight when generating the aggregated confidence score 215. The credibility score for each output may be calculated by multiplying the source and the AI agent credibility scores. It should be understood that, as utilized herein, "final" confidence score refers to a confidence score generated using a credibility associated with the source and/or AI agent and a confidence score associated with outputs generated by the AI agent (e.g., a confidence× credibility score), such as by deriving the final or aggregate confidence score from an initial confidence score using credibility scores of the source and/or AI agent, and is not an indication that the final confidence score cannot be further derived, modified and/or processed or otherwise used to generate other types of data, including other confidence scores. The initial confidence score may refer to the confidence score 209.

In some embodiments, the aggregated confidence score 215 may be assigned a high, medium, or low confidence level based on a level of confidence that the generated travel content is accurate. Based on the level of confidence, various actions may be performed. For example, responsive to a determination that the aggregated confidence score 215 has a high level of confidence, the generated output content may not undergo further review and may be considered final validated content 222. Responsive to a determination that the aggregated confidence score 215 has a medium level of confidence, the generated output may be forwarded or sent to a human analyst for additional validation or human verification 224. Responsive to a determination that the aggregated confidence score 215 has a low level of confidence, the generated output may be forwarded or sent to a backlog 226 for eventual review by a human analyst.

In some embodiments, an action may be directly determined based on the plurality of final confidence scores generated by the travel content acquisition and validation system 201. Particularly, in some embodiments, the travel content acquisition and validation system 201 may automatically determine the action to perform on the outputs 221 including the output travel data items 207 using the plurality of final confidence scores. In some embodiments, the action may be individually applied to each of the individual outputs 221 without aggregating the outputs 221 and evaluating an aggregated output. For example, the action 217 may include evaluating each of the outputs 221 individually based on comparing their respective final confidence scores to a threshold. Based on this comparison, the travel content acquisition and validation system 201 may determine whether each individual output 221 can provided to a content generation system for further processing or if further review of the output is needed.

In some embodiments, an action may additionally or alternatively be determined for an aggregated output based on the aggregated confidence score 215. The aggregated output may be an aggregation of two or more of the individual outputs 211. The aggregated confidence score 215 can be determined for the aggregated output based on a combination of two or more of the plurality of final confidence scores. The aggregated confidence score 215 may be an average of the final confidence scores (e.g., the confidence×credibility weights) across all source and agent pairs. The manner in which the average of the final confidence scores is calculated may vary based upon a type of target task (e.g., classification, regression, generation, etc.) for each source and AI agent pair. Once the master agent 213 generates the aggregated confidence score 215, an action for the aggregated output is determined and automatically implemented by the master agent 213. In some embodiments, the master agent 213 determines the action based on a comparison on the aggregated confidence score 215 to one of more thresholds. For example, in response to the aggregated confidence score being above the first threshold, the action may include displaying the aggregated output. As another example, in response to the aggregated confidence score being below the first threshold and above the second threshold, the action may include sending the aggregated output for human verification. As a final example, in response to the aggregated confidence score being below the second threshold, the action may include sending the aggregated output to a backlog database for further review.

Figure 2B:
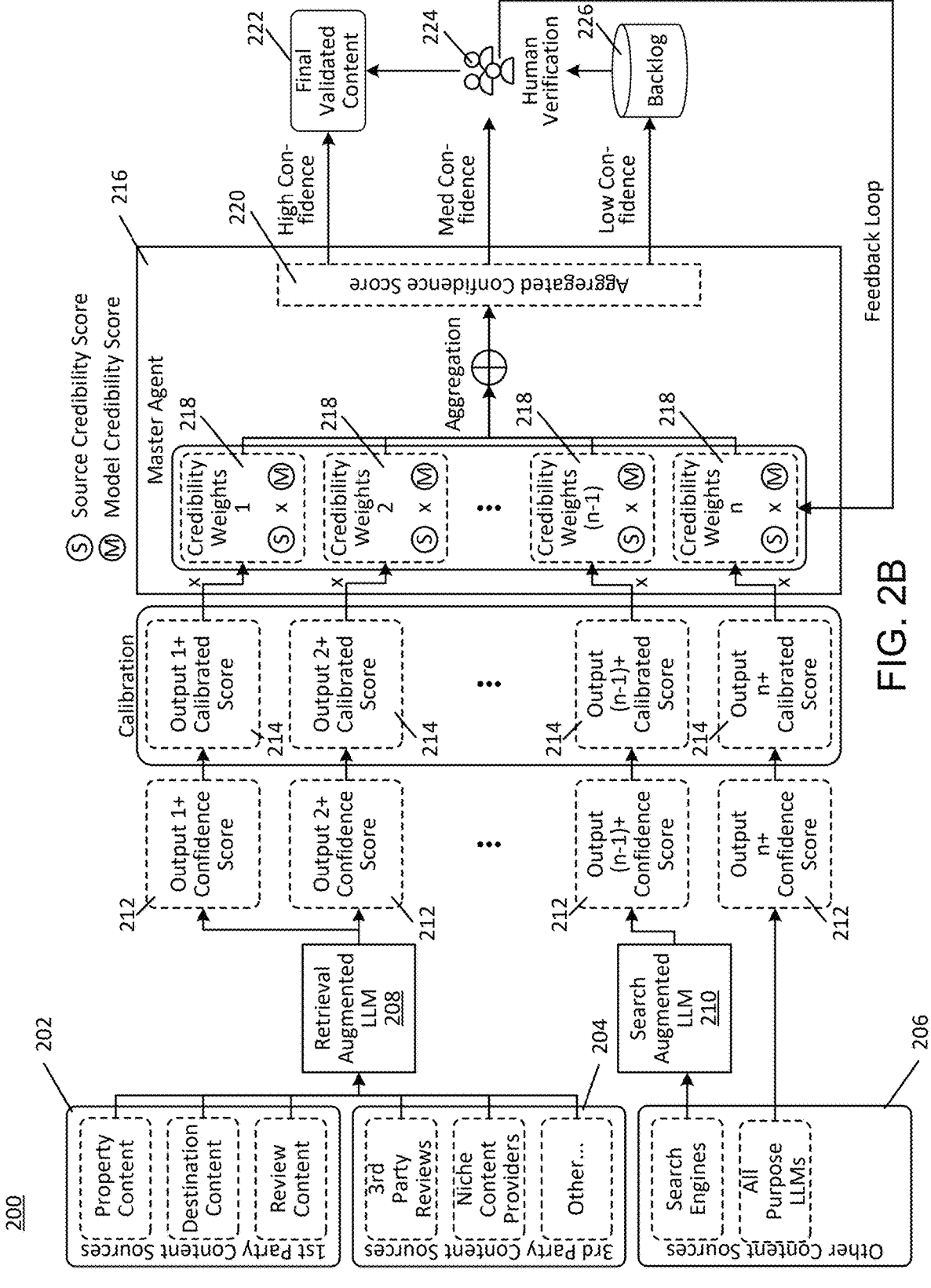
FIG. 2B depicts a block diagram of a travel content acquisition and validation system, according to a second example embodiment.

FIG. 2B illustrates the travel content acquisition and validation system 200 according to an embodiment which is configured to acquire and evaluate travel content, according to an example embodiment. In some implementations, various components and/or systems of the travel content acquisition and validation system 200 may be configured to utilize one or more artificial intelligence agents to acquire travel content from multiple different content sources. The travel content acquisition and validation system 200 is an artificial intelligence-based system that automates the process of content acquisition by leveraging the capability of Large Language Models (LLMs) to act as agents which search for and acquire travel content. Further, the agents may also be utilized to validate the content that is surfaced in the search as will be explained in more detail below.

According to some embodiments, the travel content acquisition and validation system 200 acquires the travel content from a variety content sources. For example, the travel content sources may include a number of first-party content sources 202 which are associated with the travel provider. In some embodiments, the first-party content sources 202 may be internal to the travel provider and may include travel property content, travel destination content, and travel reviews content that is internal to the travel provider. As another example, the travel content sources may include a number of third-party content sources 204. The travel content sources may include travel content from third-party sources which are not internal to the travel provider. Specifically, the third-party travel content may include third-party travel reviews (e.g., restaurant reviews, hotel and accommodation reviews, tourist attraction reviews, transportation reviews, etc.), niche content providers (e.g., travel bloggers/vloggers, etc.) among other types of third-party travel content. As another example, the travel content sources may include a variety of other content sources 206 including, but not limited to search engines and all purposed LLMs. In some embodiments, the travel content acquisition and validation system 200 may include an artificial intelligence agent which queries various black-box LLMs (e.g., OpenAI GPT models, Google Bard) to generate the output based on a given task instruction.

The travel content acquired from the first-party content sources 202, the third-party content sources 204, and any other content sources 206 may be processed by one or more AI agents (e.g., large language models). For example, the first-party content sources 202 and the third-party content sources 204 may be processed by a retrieval augmented LLM system 208 which includes a retrieval augmented LLM whereas the other content sources 206 are processed by the search augmented LLM system 210 which includes a search augmented LLM. The terms LLM and AI agent are used herein interchangeably. The retrieval augmented LLM system 208 and the search augmented LLM system 210 are described in more detail below in FIGS. 3 and 4 respectively.

Figure 3:
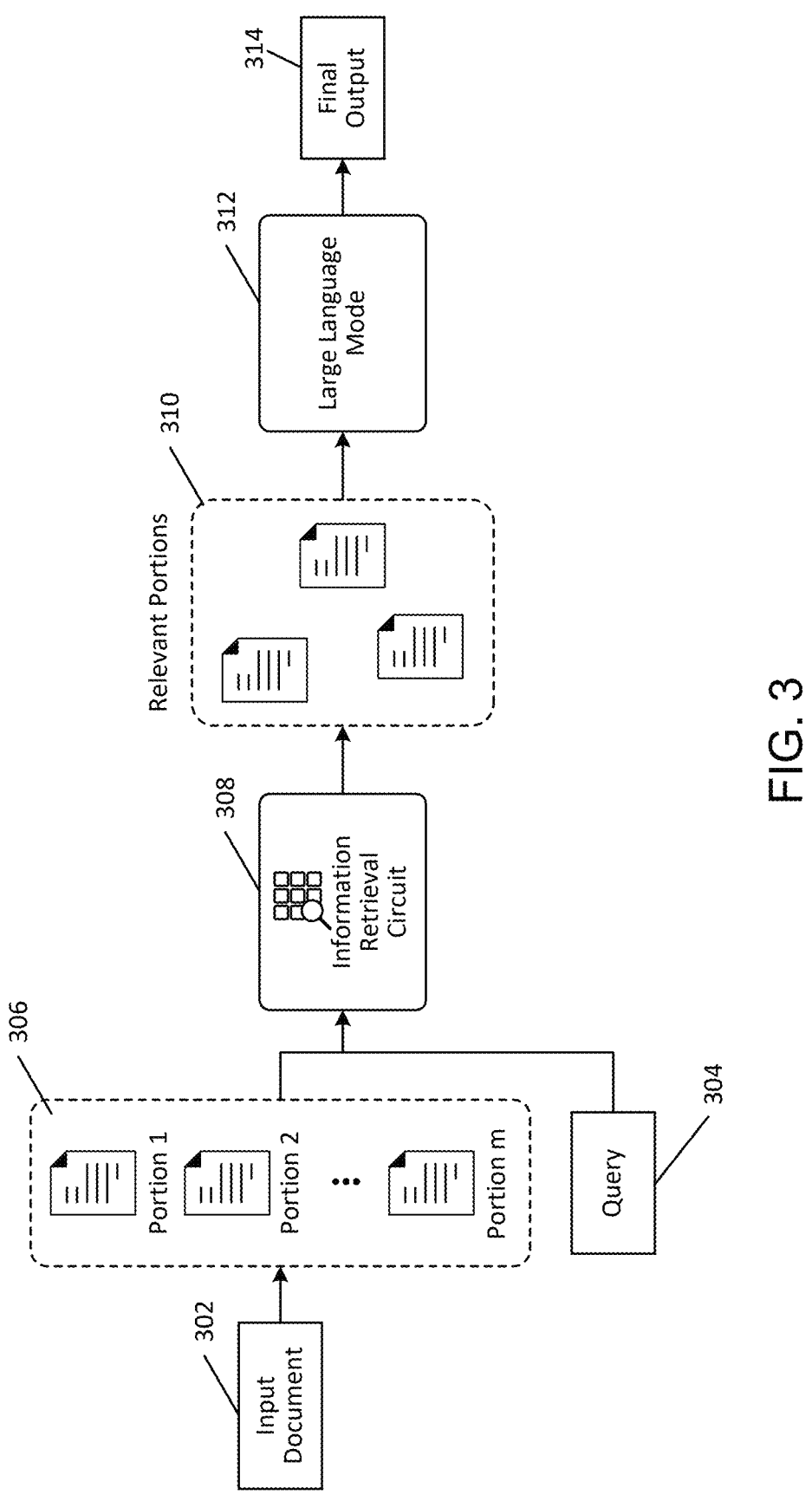
FIG. 3 depicts a block diagram of a retrieval augmented large language model process, according to an example embodiment.

Referring now to FIG. 3, the retrieval augmented LLM system 208 is described in more detail. The retrieval augmented LLM system 208 is utilizes generative AI techniques to develop an output to a travel query based on the travel content gathered from the travel content sources. In some embodiments, the travel query may be submitted to the retrieval augmented LLM system 208 requesting certain travel information. Particularly, an input document 302 and a query 304 may be input into a retrieval augmented large language model (LLM) 312 (herein referred to as the LLM 312). The LLM 312 is then configured to generate an output 314 (e.g., reply) to the query based on the information provided in the input document 302 and the query 304. In some embodiments, the input document 302 may be received from at least one of the first-party content sources 202 or the third-party content sources 204. In some embodiments, the input document 302 may be a combination of a plurality of documents from the first-party content sources 202 or the third-party content sources 204 which determined to be related to the query 304. In some embodiments, the query 304 does not have predefined structure and is therefore in an unstructured format (e.g., unstructured text, unstructured audio, unstructured speech, unstructured image, and/or unstructured video formats).

In some cases, LLMs can have token limits for sizes of inputted documents/text during training and/or runtime/ inference operations. Relaxing or increasing such limits may require increased computational processing, API calls to LLM services, and/or memory usage, limiting the ability of the LLMs to be effectively configured or operated using large amounts of raw data or otherwise unstructured data. Therefore, the length of the input document 302 may prevent the document from being properly processed by the LLM 312 in cases where the input document is over a certain size. In such cases, the input document 302 may be divided into smaller portions 306 so that the LLM 312 can properly process the input document 302 regardless of its length by evaluating the smaller portions 306 of the input document 302 one portion at a time.

In some embodiments, the retrieval augmented LLM system 208 utilizes an information retrieval circuit 308 to identify the most relevant portions 310 of the input document 302 related to the query 304 so that only the relevant portions of the input document 302 may be evaluated by the LLM 312. By only processing the relevant portions 310, the retrieval augmented LLM system 208 is able to generate the output 314 more quickly and more efficiently while using less computing resources of the provider computing system 105 to generate the output 314 because the LLM 312 is not processing unnecessary information.

The information retrieval circuit 308 may determine the relevant portions 310 by calculating a semantic similarity score between each of the portions 306 and the query 304. The information retrieval circuit 308 may then compare the semantic similarity scores for each of the portions 306 to a predefined threshold and select the relevant portions 310 which have a similarity score greater than a predefined threshold. The relevant portions 310 and the query are then input into the LLM 312. The LLM 312 summarizes the information gathered from the input document 302 to reply to the query 304 thereby generating the final output 314. In some embodiments, the LLM 312 may be any type of generative AI model which is configured to generate responses to query. For example, the LLM 312 may include, but is not limited to attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

Referring now to FIG. 4, the search augmented LLM system 210 is described in more detail. The search augmented LLM system 210 utilizes generative AI techniques to develop an output to a travel query based on the travel content gathered from a web search. Particularly, a query 402 may be submitted to the search augmented LLM system 210 requesting certain travel information. The query 402 may be input into the search engine API 404. The output of the search engine API 404 may be processed and then input into a large language model (LLM) 416 (herein referred to as the LLM 416). The LLM 416 is then configured to generate an output 418 (e.g., reply) to the query based on search results and the query 402 as will be explained in more detail below. In some embodiments, the query 402 does not have predefined structure and is therefore in an unstructured format (e.g., unstructured text, unstructured audio, unstructured speech, unstructured image, and/or unstructured video formats).

In the search augmented LLM system 210, the input to the LLM 416 consists solely of the query 402. The search augmented LLM system 210 may be configured to generate an answer/replay to the query 402 from internet-available information. The query 402 is provided to the search engine API 404 which obtains a set of search results 406. In some embodiments, obtaining the search results 406 may include running a search (e.g., submitting a query to a search engine) and obtaining or receiving search results 406 in return. In some embodiments, the search engine API 404 may be, but is not limited to Google, Bing, Yahoo, or any other search engine. In some embodiments, each of the search results 406 may include webpage link, web page title, and a snippet extracted from the webpage surfaced by the search engine. In some embodiments, the snippet is the portion of the webpage which is relevant to the query 402.

Given the overwhelming large amount of search options, the search augmented LLM system 210 may filter the search results so that only a predefined number of top search results 406 may be considered by the LLM 416. In some embodiments, the top search results 406 may be determined based on a similarity between the search result and the query 402 so that only the most relevant search results may be considered. Specifically, the search engine may determine the top search results 406 by calculating a semantic similarity score between each of the search results and the query 402. The search augmented LLM system 210 may determine the predefined number of top search results 406 based on the ranking of the search results returned by the specific search engine. For example, the search augmented LLM system 210 may consider and utilize the top N results returned by the search engine.

In some embodiments, the search augmented LLM system 210 may use a web scraping circuit 408 to scrape the selected web pages to extract paragraphs containing the snippets for additional context because the snippets included in the search result may be too short and may lack the precise information/content necessary to generate a reply to the query 402. Therefore, the search augmented LLM system 210 may obtain top paragraphs 410 from the top search results 406 based on the web scraping. The top paragraphs 410 may be determined by calculating a semantic similarity score indicative of a similarity of the paragraph to the initial query and comparing the semantic similarity scores for each of the paragraphs to a predefined threshold and selecting the top paragraphs 410 which have a similarity score greater than a predefined threshold.

Once the top paragraphs 410 are received, the search augmented LLM system 210 aggregates two or more of the search results. However, as mentioned above, LLMs can have token limits for sizes of inputted documents/text during training and/or runtime/inference operations. Relaxing or increasing such limits may require increased computational processing, API calls to LLM services, and/or memory usage, limiting the ability of the LLMs to be effectively configured or operated using large amounts of raw data or otherwise unstructured data. Further, there is a variation in the credibility of information in the top paragraphs 410 as some webpages may contain incorrect information. To resolve these issues, the search augmented LLM system 210 selectively determines which paragraphs to input to the LLM 416 for generating the final output 418. Particularly, the top paragraphs 410 may be clustered into smaller sections based on the similarity score by a clustering circuit 412. Therefore, paragraphs which are similar to each other are clustered in a group together. Subsequently, a selecting circuit 414 may select the group with the highest document count and pass it to the LLM 416 to generate the output 418. This process ensures the selection of more credible information automatically.

The LLM 416 summarizes the information gathered from the group of clustered paragraphs generate the output 418 as a reply to the query 402. In some embodiments, the LLM 416 may be any type of generative AI model which is configured to generate responses to query. For example, the LLM 416 may include, but is not limited to attention-based neural networks, transformer-based neural networks, generative pretrained transformer (GPT) models, bidirectional encoder representations from transformers (BERT) models, encoder/decoder models, sequence to sequence models, autoencoder models, generative adversarial networks (GANs), convolutional neural networks (CNNs), recurrent neural networks (RNNs), diffusion models (e.g., denoising diffusion probabilistic models (DDPMs)), or various combinations thereof.

Referring back to FIG. 2B, the outputs from the search augmented LLM system 210, the retrieval augmented LLM system 208, and/or any other all-purpose LLMs are evaluated to determine a confidence score associated with each of the outputs. Particularly, the LLMs produce outputs 212 as described above. Based on an input query, a type of output 212 may be the same for each source and AI agent pair (e.g., for each content source and corresponding AI agent). Each source and AI agent pair may have a specific task associated (e.g., classification, regression, generation, etc.). The outputs 212 may be based on the type of task (e.g., classification, regression, generation, etc.) provided to the search augmented LLM system 210, the retrieval augmented LLM system 208, and/or any other all-purpose LLMs. In some embodiments, one or more of the outputs 212 may be a classification outputs which categorizes the input data into predefined classes or categories. There are a wide range of classification tasks including binary classification, multiclass classification, and multi-label classification. In some embodiments, one or more of the outputs may be regression outputs which predict a continuous value based on input data. In some embodiments, one or more of the outputs 212 may be generation outputs which generate a series of tokens based on the input date.

In some embodiments, the outputs 212 may each have an accompanying confidence score. The confidence score describes a confidence that the model prediction/generation represented in the output 212 is correct and satisfies the model query. In some embodiments, the confidence scores may be calibrated to generate outputs with calibrated scores 214. Particularly, the individual confidence scores may be normalized to generate the calibrated score which indicates a relative comparison between the individual confidence scores associated with each of the different outputs 212. Calibration of the LLM outputs 212 is done to adjust the output probabilities of the LLM so that they better align with the true probabilities or observed frequencies in the data. Calibration is particularly important when the predicted probabilities from a LLM are used to make decisions or when they need to be interpreted as reliable estimates of the likelihood of an event. In some embodiments, the output and confidence scores 212 may be calibrated using a variety of techniques including the Platt Scaling technique, the Beta calibration technique, or sampling multiple outputs from the LLM with the same input and estimating the consistency between the outputs. Therefore, the outputs with calibrated scores 214 include calibrated confidence scores. The outputs and their accompanying scores may be referred to herein as simply outputs. For example, the outputs with confidence scores 212 may be referred to simply as outputs 212. Similarly, the outputs with calibrated scores 214 may be referred to simply as outputs 214.

The travel content acquisition and validation system 200 includes a master agent 216 which is configured to assign credibility weights 218 to each out the output with calibrated scores 214. The credibility weight represents the reliability of the content source (e.g., source credibility score) and the LLM model (e.g., model credibility score) associated with each of the outputs. The master agent 216 utilizes the credibility weight in generating an aggregated confidence score 220. Particularly, outputs which are assigned a higher credibility score will be given more weight when generating the aggregated confidence score 220 and the final output (e.g., the final validated content 222). The credibility score for each output may be calculated by multiplying the source and model credibility scores.

The aggregated confidence score 220 may be generated using multiple different techniques based on the type of task requested by the query. First, the master agent 216 may multiply the outputs with calibrated scores 214 with their associated credibility weights 218. Then, for classification tasks, the master agent 216 may employ majority voting across the outputs of different source/model pairs to determine final output classes and generate the aggregated confidence score 220. In cases where a definitive judgment is not possible due to an equal number of votes for two different categories related to the target task), the master agent 216 calculates the average (e.g., calibrated score multiplied by credibility weight) score for the outputs under each category and select the one with the higher average to be the final output. For example, the target task may be to determine what types of pool a property has. The categories could be, for example, "no pool," "indoor pool," "outdoor pool," and "rooftop pool." There may be an equal number of votes for outdoor pool and rooftop pool. The master agent 216 may calculate the average score for outputs under each of the outdoor pool and rooftop pool and select the category with a higher average to the be the final output.

As another example, for regression tasks, the master agent 216 may then compute a weighted average of the outputs with the calibrated scores 214 generated by each source/model pair by multiplying the outputs 214 by the credibility weights 218. In some embodiment, the credibility weights may be normalized across two or more each source/model pair. In this case, the master agent generates the aggregated confidence score 220 by averaging total scores (e.g., calibrated score multiplied by credibility weight) across two or more the outputs 214.

As another example, for generation tasks, the master agent 216 only considers the outputs generated by the source/model pairs that have total scores (e.g., calibrated score multiplied by credibility weight) greater than a certain predetermined threshold. In some embodiments, the predetermined threshold may be determined by using validation data and can be dynamically adjusted based on the continuous feedback received from users over time. After selectively choosing some of the outputs through the abovementioned process, the master agent 216 may send them to another LLM for summarization and generating the final output. The master agent 216 then generates the aggregated confidence score 220 by calculating the average total scores (e.g., calibrated score multiplied by credibility weight) across only the outputs 214 forwarded to the LLM for summarization and generating the final output.

Once the master agent 216 generates the aggregated confidence score 220 and the final output using any of techniques described above, the output associated with the aggregated confidence score 220 is validated based on a comparison of the aggregated confidence score 220 to one or more thresholds. The master agent 216 has three options for validating the output. As a first option, the master agent 216 may designate the output as final validated content 222 which is ready to be used (e.g., displayed to users as an answer to their query, etc.). As a second option, the master agent 216 may designate the output as needing human verification and send the output, along with additional contextual information about the outputs, to a user for human verification 224. As a third option, the master agent 216 may designate the output as requiring a more in-depth investigation and send the output, along with additional contextual information about the outputs, to a backlog 226 for further investigation. In some embodiments, the data in backlog can be used to improve the retrieval augmented and search augmented LLMs for generating future inputs using methods such as reinforcement learning from human feedback.

The master agent 216 determines which option to take based on a comparison of the aggregated confidence score 220 to two different thresholds (e.g., $t_1$ and $t_2$) that can be used to automatically assess the quality of the final generated output. In some embodiments, $t_1$ is a higher threshold than $t_2$. If the aggregated confidence score 220 is greater than $t_1$ (high confidence), the master agent 216 will select the first option (e.g., validating the output as ready for further use without any additional verification needed). If the aggregated confidence score 220 is between $t_1$ and $t_2$ (mid confidence), the master agent 216 will select the second option (e.g., sending the output and the additional contextual information to a human user for verification). If the aggregated confidence score 220 is below both $t_1$ and $t_2$ (low confidence), the master agent 216 will select the third option (e.g., sending the output and the additional contextual information to the backlog for further investigation).

If the second option is selected by the master agent 216, a human user may be presented with the outputs and asked to approve the truthful ones. If the final output associated with the aggregated confidence score 220 gets approved by the human, the master agent automatically increases both source and model credibility scores for the source/model pairs that contributed to generating the final output. For the rest of the source/model pairs, the human evaluator may determine whether the misinformation comes from the source, or if the model is at fault (e.g., hallucinated). Ultimately, the master agent 216 automatically decreases the corresponding credibility score based on the human feedback. Further, in some embodiments, the human users may evaluate the items in the backlog when they have additional capacity.

In some embodiments, the thresholds $t_1$ and $t_2$ are initialized with fixed values at the beginning and may be dynamically updated based on human resource availability. Specifically, human evaluators may to look at a random sample of directly verified or rejected outputs and provide feedback. The feedback may then be used to adjust $t_1$ and $t_2$. In some embodiments, a machine learning process optimizes the thresholds $t_1$ and $t_2$ based on human resource forecasting as well as human feedback on correctness of outputs.

Referring now to FIG. 5, a flowchart of an example method 500 for acquiring and validating travel content is shown, in accordance with one or more implementations. Although the operations of the method 500 are described as being performed by portions of a system (e.g., systems 100, 200, and 201), it should be understood that the method 500 may be executed using any suitable computing system. It may be appreciated that certain steps of the method 500 may be executed in parallel (e.g., concurrently) or sequentially. It may also be appreciated that while certain acts of the method 500 are shown as being performed by a specific device, some acts may be performed by another device of the system 100 in FIG. 1 and the travel content acquisition and validation systems 200 and 201 of FIGS. 2A-2B.

At step 502, the travel content acquisition and validation systems 200 or 201 acquires travel data from a plurality of content sources using a plurality of artificial intelligence (AI) agent. As explained above, the travel content acquisition and validation systems 200 or 201 includes the variety of content sources. The travel data can be acquired from these content sources as explained above.

At step 504, the travel content acquisition and validation systems 200 or 201 generates, by a plurality of AI agents, a plurality of output travel data items from the acquired travel data and a plurality of confidence scores for the output travel data items. In some embodiments, the output travel data items may be generated in response to the unstructured query as described above. In some embodiments, the plurality of AI agents may include the retrieval augmented LLM 312, the search augmented LLM 416, or any other all purpose LLM. The process for generating the outputs is described in more detail above. Each of the output travel data items may include an accompanying confidence score. The confidence score describes the confidence of the model (e.g., the AI agent) that the generated output satisfies the model query. In some embodiments, the confidence scores are normalized to generate a calibrated score indicating a relative comparison between the confidence scores associated with each of the different plurality of outputs. In some embodiments, the credibility weight is determined based on source credibility score indicating a credibility associated with a source of the output and an AI agent credibility score (e.g., model credibility score) indicating a credibility associated AI agent used to generate the output.

At step 506, the travel content acquisition and validation systems 200 or 201 aggregates the plurality of output travel data items to generate an aggregated final confidence score based on credibility weights and individual confidence scores associated with each of the plurality of output travel data items. As explained above, this aggregation is done by the master agent 216. The process for generating the aggregated confidence score is described in more detail above with respect to FIGS. 2A-2B.

At step 508, the travel content acquisition and validation systems 200 or 201 automatically determines an action to perform on one or more of the plurality of output travel data items using the final confidence score of the one or more output travel data items. In some embodiments, the action is determined for each of the plurality of output travel data items individually. For example, the action may include evaluating each of the plurality of output travel data items individually based on comparing their respective final confidence scores to a threshold. Based on this comparison, the systems 201 and/or 200 may determine whether each individual output travel data item can be provided to a content generation system for further processing (e.g., content creation, content summarization, etc.) or if further review of the output is needed.

In other embodiments, the action is determined for an aggregated output which is a combination of the plurality of output travel data items. In this case, the action is determined based on a comparison of an aggregated confidence score to one or more thresholds. For example, in response to the aggregated confidence score being above the first threshold, the action may include displaying the aggregated output. As another example, in response to the aggregated confidence score being below the first threshold and above the second threshold, the action may include sending the aggregated output for human verification. As a final example, in response to the aggregated confidence score being below the second threshold, the action may include sending the aggregated output to a backlog database for further review. At step 510, the travel content acquisition and validation systems 200 or 201 automatically performs the action.

In some embodiments, the credibility weights may be updated based on the comparison of the aggregated confidence score 220 to the first and second threshold. In some embodiments, human feedback may be used to update the thresholds. Specifically, human evaluators may to look at a random sample of directly verified or rejected outputs and provide feedback. The feedback may then be used to adjust first and second threshold.

The term "coupled," as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

The implementations described herein have been described with reference to drawings. The drawings illustrate certain details of specific implementations that implement the systems, methods, and programs described herein. Describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. In a non-limiting example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively, or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, in a non-limiting example, the one or more processors may be a remote processor (e.g., a cloud-based processor). Alternatively, or additionally, the one or more processors may be internal or local to the apparatus. In this regard, a given circuit or components thereof may be disposed locally (e.g., as part of a local server, a local computing system) or remotely (e.g., as part of a remote server such as a cloud-based server). To that end, a "circuit" as described herein may include components that are distributed across one or more locations.

An exemplary system for implementing the overall system or portions of the implementations might include general-purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard disks, optical disks, etc. In other implementations, the volatile storage media may take the form of RAM, TRAM, ZRAM, etc. Combinations of the above are also included within the scope of machine-readable media. In this regard, machine-executable instructions comprise, in a non-limiting example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. In a non-limiting example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementations," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions, and implementation of the implementations without departing from the scope of the present disclosure as expressed in the appended claims.

What is claimed is:

1. A method of automatically acquiring and assessing travel data, comprising:

acquiring, by a processing circuit comprising one or more processors and one or more computer-readable storage media having instructions stored thereon executable by the one or more processors, the travel data from a plurality of content sources using a plurality of artificial intelligence (AI) agents;

generating, by the processing circuit using the AI agents, a plurality of output travel data items from the acquired travel data and a plurality of confidence scores for the plurality of output travel data items;

generating, by the processing circuit, a plurality of final confidence scores for the plurality of output travel data items, each of the plurality of final confidence scores for a different respective output travel data item of the plurality of output travel data items, and each of the plurality of final confidence scores generated based on a combination of (i) a confidence score for the output travel data item, (ii) a source credibility score associated with a reliability of the content source from which the travel data was acquired for the output travel data item, and (iii) an AI agent credibility score associated with a reliability of the AI agent that generated the output travel data item;

automatically determining, by the processing circuit, an action to perform on one or more of the plurality of output travel data items using the plurality of final confidence scores of the plurality of output travel data items; and automatically performing the action.

2. The method of claim 1, wherein the plurality of content sources includes at least one of a first party property content source, a first party destination content source, a first party review content source, a third party review content source, a search engine content source, or a machine learning model.

3. The method of claim 1, wherein the plurality of AI agents includes a retrieval augmented large language model (LLM), and wherein generating the plurality of output travel data items and the plurality of confidence scores comprises:

receiving, by the processing circuit using the retrieval augmented LLM, a query and an input document;

dividing, by the processing circuit using the retrieval augmented LLM, the input document into portions;

identifying, by the processing circuit using the retrieval augmented LLM, one or more portions of the input document related to the query; and evaluating, by the processing circuit using the retrieval augmented LLM, the identified portions of the input document to generate one or more of the plurality of output travel data items and the confidence scores for the one or more output travel data items.

4. The method of claim 1, wherein the plurality of AI agents includes a search augmented large language model (LLM) and wherein generating the plurality of output travel data items and the plurality of confidence scores comprises:

receiving, by the processing circuit using the search augmented LLM, a query;

obtaining, by the processing circuit, from a search engine using the search augmented LLM, a plurality of search results based on the query;

identifying, by the processing circuit using the search engine, one or more search results of the plurality of search results related to the query; and evaluating, by the processing circuit using the search augmented LLM, the identified search results to generate one or more of the plurality of output travel data items and the confidence scores for the one or more output travel data items.

5. The method of claim 4, further comprising:

extracting, by the processing circuit using the search augmented LLM, additional textual information for each of the identified search results;

grouping, by the processing circuit using the search augmented LLM, the additional textual information into a plurality of subsets;

selecting, by the processing circuits using the search augmented LLM, a subset of the plurality of subsets for use in generating the one or more of the plurality of output travel data items and the confidence scores for the one or more output travel data items.

6. The method of claim 5, wherein the additional textual information is grouped based on a similarity of the additional textual information to other additional textual information in the subset; and wherein the subset of the plurality of subsets is selected based on an amount of additional textual information in each subset.

7. The method of claim 1, further comprising calibrating, by the processing circuit, the plurality of confidence scores to generate a plurality of calibrated scores, wherein calibrating comprises adjusting the plurality of confidence scores based on one or more data trends, wherein generating the plurality of final confidence scores comprises generating the plurality of final confidence scores based on the plurality of calibrated scores, the source credibility scores, and the AI agent credibility scores.

8. The method of claim 1, further comprising:

aggregating, by the processing circuit, two or more of the plurality of output travel data items and the final confidence scores for the two or more output travel data items to generate an aggregated output and an aggregated confidence score; and evaluating, by the processing circuit, the aggregated output and the aggregated confidence score.

9. The method of claim 8, wherein evaluating the aggregated output further comprises:

comparing, by the processing circuit, the aggregated confidence score to a threshold;

in response to the aggregated confidence score being above the threshold, automatically approving the aggregated output; and in response to the aggregated confidence score being below the threshold, causing, by the processing circuit, the aggregated output to be provided for human verification.

10. The method of claim 9, wherein the threshold comprises a first threshold, and wherein evaluating the aggregated output further comprises:

comparing, by the processing circuit, the aggregated confidence score to a second threshold;

in response to the aggregated confidence score being below the first threshold and above the second threshold, causing, by the processing circuit, the aggregated output to be provided for human verification; and in response to the aggregated confidence score being below the second threshold, sending, by the processing circuit, the aggregated output to a backlog for delayed human verification.

11. A travel content acquisition and validation system for acquiring travel content utilizing a plurality of artificial intelligence (AI) agents, the travel content acquisition and validation system comprising:

one or more memory devices having instructions stored thereon that, when executed by one or more processors, cause the one or more processors to perform operations comprising:

acquiring travel data from a plurality of content sources using the plurality of AI agents;

generating, using the AI agents, a plurality of output travel data items from the acquired travel data and a plurality of confidence scores for the plurality of output travel data items;

generating a plurality of final confidence scores for the plurality of output travel data items, each of the plurality of final confidence scores for a different respective output travel data item of the plurality of output travel data items, and each of the plurality of final confidence scores generated based on a combination of (i) a confidence score for the output travel data item, (ii) a source credibility score associated with a reliability of the content source from which the travel data was acquired for the output travel data item, and (iii) an AI agent credibility score associated with a reliability of the AI agent that generated the output travel data item;

aggregating two or more of the plurality of output travel data items and the final confidence scores for the two or more output travel data items to generate an aggregated output and an aggregated confidence score;

automatically determining an action to perform on one or more of the plurality of output travel data items using the aggregated confidence score; and automatically performing the action.

12. The travel content acquisition and validation system of claim 11, wherein the plurality of content sources includes at least one of a first party property content source, a first party destination content source, a first party review content source, a third-party review content source, a search engine content source, or a machine learning model.

13. The travel content acquisition and validation system of claim 11, wherein the plurality of AI agents includes a retrieval augmented large language model (LLM), and wherein generating the plurality of output travel data items and the plurality of confidence scores comprises:

receiving, using the retrieval augmented LLM, a query and an input document;

dividing, using the retrieval augmented LLM, the input document into portions;

identifying, using the retrieval augmented LLM, the most relevant portions of the input document related to the query; and evaluating, using the retrieval augmented LLM, the identified portions of the input document to generate one or more of the plurality of output travel data items and the confidence scores for the one or more output travel data items.

14. The travel content acquisition and validation system of claim 11, wherein the plurality of AI agents includes a search augmented large language model (LLM), and wherein generating the plurality of output travel data items and the plurality of confidence scores comprises: 410 receiving, using the search augmented LLM, a query;

obtaining, from a search engine using the search augmented LLM, a plurality of search results based on the query;

identifying, using the search engine, one or more search results of the plurality of search results related to the query; and evaluating, using the search augmented LLM, the identified search results to generate one or more of the plurality of output travel data items and the confidence scores for the one or more output travel data items.

15. The travel content acquisition and validation system of claim 11, further comprising calibrating, by the one or more processors, the plurality of confidence scores to generate a plurality of calibrated scores, the calibrating comprising adjusting the plurality of confidence scores based on one or more data trends, wherein generating the plurality of final confidence scores comprises generating the plurality of final confidence scores based on the plurality of calibrated scores, the source credibility scores, and the AI agent credibility scores.

16. The travel content acquisition and validation system of claim 11, further comprising evaluating the aggregated output and the aggregated confidence score.

17. The travel content acquisition and validation system of claim 16, wherein evaluating the aggregated output further comprises:

comparing, by the one or more processors, the aggregated confidence score to a threshold;

in response to the aggregated confidence score being above the threshold, automatically approving the aggregated output; and in response to the aggregated confidence score being below the threshold, causing, by the one or more processors, the aggregated output to be provided for human verification.

18. The travel content acquisition and validation system of claim 17, wherein the threshold comprises a first threshold, and wherein evaluating the aggregated output further comprises:

comparing, by the one or more processors, the aggregated confidence score to a second threshold;

in response to the aggregated confidence score being below the first threshold and above the second threshold, causing, by the one or more processors, the aggregated output to be provided for human verification; and in response to the aggregated confidence score being below the second threshold, sending, by the one or more processors, the aggregated output to a backlog for delayed human verification.

19. A non-transitory computer readable medium comprising instructions stored thereon that, when executed by one or more processors, cause the one or more processors to perform operations comprising:

acquiring travel data from a plurality of content sources using a plurality of artificial intelligence (AI) agents;

generating, using the AI agents, a plurality of output travel data items from the acquired travel data and a plurality of confidence scores for the plurality of output travel data items;

generating a plurality of final confidence scores for the plurality of output travel data items, each of the plurality of final confidence scores for a different respective output travel data item of the plurality of output travel data items, and each of the plurality of final confidence scores generated based on a combination of (i) a confidence score for the output travel data item, (ii) a source credibility score associated with a reliability of the content source from which the travel data was acquired for the output travel data item, and (iii) an AI agent credibility score associated with a reliability of the AI agent that generated the output travel data item;

aggregating, by a master agent, the plurality of output travel data items and the plurality of final confidence scores for the plurality of output travel data items to generate an aggregated final output and an aggregated confidence score;

automatically determining an action to perform on one or more of the plurality of output travel data items using the aggregated confidence score; and automatically performing the action.

20. The non-transitory computer readable medium of claim 19, wherein the plurality of content sources includes at least one of a first party property content source, a first party destination content source, a first party review content source, a third-party review content source, a search engine content source, or a machine learning model.

* * * * *